United States Patent
Abdul Manaf et al.

(10) Patent No.: US 9,059,815 B2
(45) Date of Patent: Jun. 16, 2015

(54) BROADBAND OPTICAL COMMUNICATION NETWORK HAVING OPTICAL CHANNEL PROTECTION APPARATUS

(71) Applicant: Telekom Malaysia Berhad, Kuala Lumpur (MY)

(72) Inventors: Zulhedry Abdul Manaf, Bandar Baru Bangi (MY); Dress Andriyanto M. Ssi, Jawa Barat (ID); Dedy Tarsono, Jawa Barat (ID); Asmahanim Ahmad, Kajang (MY)

(73) Assignee: Telekom Malaysia Berhad, Kuala Lumpur (MY)

( * ) Notice: Subject to any disclaimer, the term of this patent is extended or adjusted under 35 U.S.C. 154(b) by 132 days.

(21) Appl. No.: 13/857,270

(22) Filed: Apr. 5, 2013

(65) Prior Publication Data
US 2013/0266318 A1    Oct. 10, 2013

(30) Foreign Application Priority Data
Apr. 6, 2012    (MY) .............................. 2012001582

(51) Int. Cl.
H04J 14/02    (2006.01)
H04B 10/40    (2013.01)
H04Q 11/00    (2006.01)

(52) U.S. Cl.
CPC ............ *H04J 14/0293* (2013.01); *H04B 10/40* (2013.01); *H04Q 2011/0018* (2013.01)

(58) Field of Classification Search
USPC ..................................................... 398/43–103
See application file for complete search history.

(56) References Cited

U.S. PATENT DOCUMENTS

| 5,777,761 A * | 7/1998 | Fee ................................... 398/7 |
| 7,099,578 B1 * | 8/2006 | Gerstel ............................ 398/5 |
| 2012/0082458 A1 * | 4/2012 | Bouda et al. .................... 398/69 |

* cited by examiner

*Primary Examiner* — David Payne
*Assistant Examiner* — Casey Kretzer
(74) *Attorney, Agent, or Firm* — Cesari and McKenna, LLP (57) ABSTRACT

The present invention provides an improved optical communication network (300) that utilizes an apparatus of optical channel protection. The apparatus for optical channel protection of the present invention including a transmitting end network switch (200), a first and a second receiving end network switch (201, 202), a plurality of wavelength tuneable transmitting end transponders (400, 401 ... 405), a plurality of wavelength tuneable receiving end transponders (400', 401' ... 405'), a transmitting end controller (10a) connected to a network monitoring and control system (100a) and a receiving end controller (10b) connected to said network monitoring and control system (100a). The present invention utilizes a method of optical channel protection that can be broadly categorized under optical multiplex switching.

7 Claims, 3 Drawing Sheets

BROADBAND OPTICAL COMMUNICATION NETWORK HAVING OPTICAL CHANNEL PROTECTION APPARATUS

CROSS REFERENCE TO RELATED APPLICATIONS

This application claims the benefit of the priority date of Malaysian Application No. PI 2012001582 filed Apr. 6, 2012, the contents of which are hereby incorporated by reference in their entirety.

The present invention relates to the field of optical channel protection in optical networks. More particularly the present invention relates to an improved broadband optical network that incorporates an optical channel protection apparatus that provides for broadband optical channel protection in broad band fibre optic communication networks.

BACKGROUND TO THE INVENTION

Many core and metro networks have already migrated to fibre optics. Fibre optics are also entering the access network arena, reaching the neighbour-hood, the premises, the business and the home. New packet technologies create new applications, driving demand for bandwidth and higher QoS (Quality of Service), including high network availability.

All this traffic is enabled by multiple optical resources, which are gathered together to construct a transport network. These resources include fibres, passive optical elements, CPE equipment (routers, switches, line cards), network equipment (transponders, DWDM multiplexers, optical amplifiers, regenerators), and more. However, it is enough for one of these heterogeneous resources to fail in order to bring the network down, as in the case of fibre cuts during road construction or equipment failure. Backup resources which can quickly take over upon such a failure are essential to guarantee high network availability. This is where optical channel protection comes into play to provide for the contingency of provisioning alternate paths for optical communication traffic data in the event the main data path becomes inoperable.

Protection of traffic in optical networks can generally be classified under two types. The first type of protection being a concept of line protection is a so-called Optical Multiplex Section (OMS) protection used preferably in a multi-channel multi-section ring networks. The ring network is formed by at least two concentric optical fibre rings capable of carrying data traffic in two opposite directions (clockwise and counter-clockwise) between network elements NE in the ring. The two concentric fibre rings usually serve as a main route and a protection route for all optical channels of the network, although sometimes the main and the protection routes are arranged within the same fibre. The OMS protection ensures in case of a fault of the traffic via a multiplex section on the main route and a protection route (say in a section between two specific network elements, that may include multiple optical channels), the protection route that can be used to redirect the required data traffic from the main route, and thus bring the traffic to its destination network element using the opposite direction. In this case, the redirected traffic must pass a longer distance than it would pass via the main route. The OMS protection is usually utilized in SDH and SONET, where it is respectively named MSSPRING (Multiplex Section Shared Protection Ring) and BLSR (Bi-Directional Line Shared Protection).

The second known type of traffic protection in optical networks is a so-called OCH protection (Optical Channel Protection). The OCH protection is intended for protecting a specific optical channel and by default can be implemented by providing simultaneous transmission of data traffic of that specific optical channel along both the main route and the protection route. In case of a fault in one of the routes, the other will safely bring the traffic to its destination point.

U.S. Pat. No. 7,840,133 B2 provides a technique for carrying out protection of data traffic in a multi-channel multi-section optical communications network by simultaneously using Optical Multiplexed Section (OMS) protection and Optical Channel (OCH) protection. The technique comprises selection of a working optical signal in an OCH protected optical channel, in case of a fault in a section of the network, by relying on an indication associated with OMS switching functionality that is required to overcome the mentioned fault.

US 2002/0180957 A1 discloses a hub structure for use in an optical network, the optical network comprising a ring structure carrying a bidirectional optical data signal and a plurality of hub structures arranged in-line within the ring structure, the optical data signal comprising primary and secondary path transmission signals having opposing transmission directions on the ring structure, the hub structure comprising a drop unit arranged, in a normal state, to drop and through connect a secondary receive path signal for further processing at the hub structure.

Thus far there has yet to be disclosed an apparatus and method of cost effective optical channel protection for optical communication networks that enables switching between a primary data transmission path that serves as a main data transmission path and a secondary data transmission path that serves as an auxiliary data transmission path in the event the primary data transmission path experiences a fault.

SUMMARY OF THE INVENTION

The following presents a summary of the invention in order to provide a basic understanding of some aspects of the invention. This summary is not an extensive overview of the invention. It is not intended to identify key/critical elements of the invention. Its purpose is to present some concepts of the invention in a simplified form as a prelude to the more detailed description that is presented later.

The present invention provides an improved broadband optical network that incorporates an improved optical channel protection apparatus. The optical communication network comprising of:
  a transmitting end that includes:
  a plurality of transmitting end CPEs (Customer Premise Equipment) that are configured to transmit a plurality of transmission data optical signals at distinct optical wavelengths;
  a first plurality of transmitting end fibre optic links that serve as a primary data transmission path for the transmission data optical signals originating from the plurality of transmitting end CPEs;
  a plurality of transmitting end non-tuneable transponders, each transponder being responsive to a particular wavelength of a transmission data optical signal of the plurality of transmission data optical signals, that corresponds to a transmission data optical signal originating from a corresponding CPE of the plurality of transmitting end CPEs;
    the plurality of transmitting end non-tuneable transponders serving to receive a plurality of transmission data optical signals originating from the plurality of transmitting end CPEs via the first plurality of transmitting end fibre optic links and transmit said plurality of transmission data optical signals to a transmitting end CWDM/DWDM optical multiplexer;

the transmitting end CWDM/DWDM optical multiplexer serving to wavelength multiplex the plurality of transmission data optical signals and route a resulting wavelength multiplexed optical signal to a receiving end of the optical communication network;

a main fibre link that serves as a propagation and transmission media that allows the transmission and propagation of a wavelength multiplexed transmission data fibre optic signal that represents plurality transmission data optical signals originating from the plurality of transmitting end CPEs;

a receiving end that comprises;

a receiving end CWDM/DWDM optical de-multiplexer that serves to wavelength de-multiplex and route the de-multiplexed transmission data optical signals to a corresponding receiving end CPE of a plurality of receiving end CPEs via a corresponding receiving end non-tuneable transponder of a plurality of receiving end non-tuneable transponders.

The improved broadband optical network of the present invention further incorporating an apparatus for optical channel protection that includes:

a transmitting end network switch, that is optically interconnected at a receiving side to the plurality of transmitting end CPEs and optically interconnected at the transmitting side (i.e. output side) to the plurality of non-tuneable transmitting end transponders and a plurality of transmitting end wavelength tuneable transponders; said transmitting end network switch serving to route transmission data optical signals originating from any one of the plurality of transmitting end CPEs (Customer Premise Equipment) to any one of the plurality of transmitting end non-tuneable transponders and/or any one of the plurality of transmitting end tuneable transponders;

each of said transmitting end wavelength tuneable transponder corresponding to each non-tuneable transmitting end transponder of opposite symmetrical location in relation to the location of each of said transmitting end non-tuneable transponder;

a second plurality of fibre optic links at the transmitting end that serve as auxiliary data transmission paths for the transmission data optical signals originating from any one of the plurality of transmitting end CPEs', in the event that any one of the first plurality of fibre optic links, or any one of the plurality of transmitting end non-tuneable transponders that correspond to any one of the first plurality of CPE's experiences a fault;

each of said transmitting end wavelength tuneable transponder being optically linked to a corresponding transmitting end CPE of the plurality of transmitting end CPEs via the transmitting end network switch and one of the second plurality of fibre optic links that corresponds to the corresponding transmitting end CPE;

a 1×N optical coupler, that serves to couple transmission data optical signals originating from any one of the plurality of transmitting end wavelength tuneable transponders and transmit an optically coupled transmission data optical signal to a 1×2 optical coupler; the 1×2 optical coupler, serving to couple the optically coupled transmission data optical signal output from the 1×N optical coupler to a wavelength multiplexed transmission data optical signal, output by the transmitting end CWDM/DWDM optical multiplexer;

a first receiving end network switch that is optically interconnected to the receiving end CWDM/DWDM de-multiplexer at a receiving side (i.e. input side) and being optically interconnected to a plurality of receiving end wavelength tuneable transponders and the plurality of receiving end non-tuneable transponders at a transmitting side (i.e. output side);

said receiving end first network switch serving to receive a plurality of optically wavelength division de-multiplexed transmission data optical signals originating from the receiving end CWDM/DWDM optical de-multiplexer and routing the received optically wavelength division multiplexed transmission data optical signals to the corresponding receiving end non-tuneable transponders of the plurality of non-tuneable receiving end transponders and/or corresponding receiving end wavelength tuneable transponders of a plurality receiving end wavelength tuneable transponders;

each receiving end wavelength tuneable transponder of the plurality of receiving end wavelength tuneable transponders corresponding to each receiving end non-tuneable transponder of the plurality of receiving end non-tuneable transponders of opposite symmetrical location in relation to the location of said each receiving end wavelength tuneable transponder;

a second receiving end network switch that is optically interconnected to a plurality of the plurality of receiving non tuneable transponders and the plurality of receiving end wavelength tuneable transponders at a receiving side (i.e. input side) and a plurality of receiving end CPEs at the transmitting side (i.e. output side); said second network switch serving to receive and route optical signals of predefined wavelengths originating from any one of the plurality receiving end non-tuneable transponders and/or any one of the receiving end wavelength tuneable transponders to a corresponding receiving end CPE;

a transmitting end controller that serves to control the routing of optical signals by the transmitting end network switch;

a receiving end controller that serves to control the routing of optical signals by the first and second receiving end network switches respectively; and a network monitoring and control system that coordinates and arbitrates the operation of the transmitting end controller and the receiving end controller It should be noted that the plurality of transmitting end non-tuneable transponders and the plurality of transmitting end wavelength tuneable transponders serve to convert transmission data optical signals transmitted by the plurality of transmitting end CPEs from 1310 nm or 1500 nm optical signals into the ITU-T DWDM (Dense Wavelength Division Multiplexing) or ITU-T CWDM (Coarse Wavelength Division Multiplexing) transmission format, before relaying aforementioned transmission data optical signals to the subsequent stage of the transmitting end of the broadband optical communication network of the present invention and hence the receiving end via the main fibre link of the broadband optical communication network of the present invention. Conversely, at the receiving end, the plurality of receiving end non-tuneable transponders and the plurality of receiving end wavelength tuneable transponders serve to the de-multiplexed transmission data optical signals, received via the output lines of the receiving end CWDM/DWDM optical de-multiplexer.

DETAILED DESCRIPTION OF THE INVENTION

The detailed description set forth below in connection with the appended drawings is intended as a description of an exemplary embodiment and is not intended to represent the only form in which the embodiment may be constructed and/or utilized. The description sets forth the functions and the sequence for constructing the exemplary embodiment. However, it is to be understood that the same or equivalent functions and sequences may be accomplished by different embodiments that are also intended to be encompassed within the scope of this disclosure.

Figure 1:
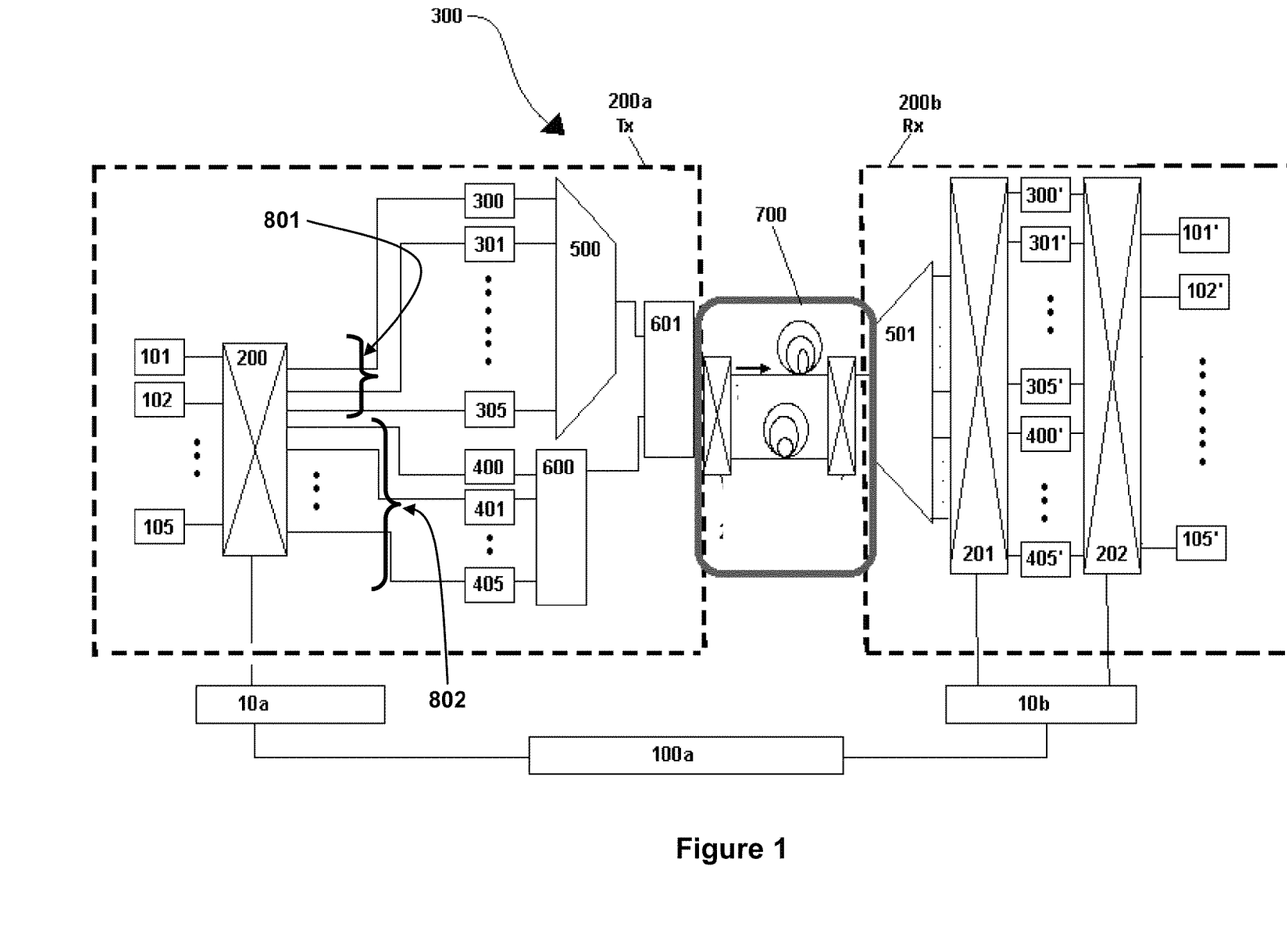
FIG. 1 is a diagram illustrating an exemplary optical communication network comprising of a transmitting end, a fibre link and a receiving end which incorporates a first preferable embodiment of the apparatus for optical channel protection of the present invention.

It should be noted, that description set forth in the following passages, with reference to FIGS. 1 to 3, only describe a preferable embodiment of the broadband optical communication network 350 of the present invention.

The present invention provides an improved broadband optical network 350 that incorporates an improved optical channel protection apparatus.

A preferable embodiment of the improved broadband optical network 350 of the present invention will now be described with reference to FIG. 1. Before proceeding further, it should be noted that the preferable embodiment of the improved optical communication network 350 of the present invention as described herein, is an improved broadband optical communication network 350 due to incorporation of an improved optical channel protection apparatus.

Aforementioned improved broadband optical communication network 350 broadly comprising of a transmitting end 200a optically interconnected to a receiving end 200b by a main fibre link 700. Broad-band optical communication in the improved broadband optical communication of the network 350 of the present invention being a consequence of the utilization wavelength division multiplexing and de-multiplexing to increase the information carrying capacity of the main fibre link 700.

The transmitting end 200a of the broadband optical communication network 350 of the present invention, comprising of the following:
  a plurality of transmitting end CPEs (Customer Premise Equipment) 100, 101 . . . 105 that are configured to transmit a plurality of transmission data optical signals at distinct optical wavelengths;
  a transmitting end network switch 200, that is optically interconnected at a receiving side to the plurality of transmitting end CPEs 100, 101, . . . , 105 and optically interconnected at the transmitting side (i.e. output side) to a plurality of non-tuneable transmitting end transponders 300, 301, . . . , 305 and a plurality of transmitting end wavelength tuneable transponders 400, 401, . . . , 405 via a first and second plurality of transmitting end fibre optic links 801, 802 respectively.
  a transmitting end CWDM/DWDM optical multiplexer 500 that is optically interconnected at its input side (i.e.

receiving side) to the plurality of transmitting end non-tuneable transponders 300, 301, . . . , 305 and optically interconnected at its output side (i.e. transmitting side) to a 1×2 optical coupler 601; and
  a 1×N optical coupler 600 that is optically interconnected at its input side to the plurality of transmitting end wavelength tuneable transponders 400, 401, . . . , 405 and optically interconnected at its output side to the 1×2 optical coupler 601.

The output of the 1×2 optical coupler 601 being optically interconnected to the main fiber link 700, to consequently enable transmission of a wavelength division multiplexed transmission data optical signal to the receiving end 200b of the broadband optical communication network 350 of the present invention.

The receiving end 200b of the broadband optical communication network 300 of the present invention comprising of the following components:
  a receiving end CWDM/DWDM optical de-multiplexer 501 that is optically interconnected at its input to the main fibre link 700 to consequently enable reception of the wavelength division multiplexed transmission data optical signal from the transmitting end 200a;
  a receiving end first network switch 201 that is optically interconnected at a receiving side to a plurality of output lines of the CWDM/DWDM optical de-multiplexer 501 and optically interconnected at its transmitting side to a plurality of receiving end non-tuneable transponders 300', 301', . . . , 305' and a plurality of receiving end wavelength tuneable transponders 400', 401', . . . , 405';
  a receiving end second network switch 202 that is optically interconnected to at its receiving side to the plurality of receiving end non-tuneable transponders 300', 301' . . . , 305' and a plurality of receiving end wavelength tuneable transponders 400', 401', . . . , 405' and optically interconnected at its transmitting side to a plurality of receiving end CPEs 100' 101', . . . , 105'.

The optical switching and routing of optical signals by the transmitting end network switch 200 being controlled by a transmitting end controller 10a and likewise the optical switching and routing of optical signals of the first and second receiving end network switches 201, 202 being controlled by a receiving end controller 10b. Both the controllers 10a, 10b being, electrically/optically interconnected to a network monitoring and control system 100a that coordinates and arbitrates the operations of said transmitting end and receiving end controllers 10a, 10b.

It should be noted that, each of the plurality of non-tuneable transmitting end transponders 300, 301, . . . , 305 and each of the plurality of non-tuneable receiving end transponders 300', 301', . . . , 305', are responsive to predefined wavelengths of transmission data optical signals originating from corresponding transmitting end CPEs. Particularly, transponders 300 and 300' are responsive to a transmission data optical signal transmitted at a first wavelength by a first CPE 100; transponders 301 and 301' are responsive to a transmission data optical signal transmitted at a second wavelength by a second CPE 101; and transponders 305 and 305' are responsive to a transmission data optical signal transmitted at a third wavelength by a third CPE 105.

Upon initial reading of the description of a preferable embodiment of the broadband optical communication network 350 of the present invention, as presented above, it may not be evident to the reader that the above said improved broadband optical communication network 350 incorporates an optical channel protection apparatus. More particularly the optical channel protection apparatus of the present invention comprises of the following components of the broadband optical communication network 350:

1. The transmitting end network switch 200 that is optically interconnected to the plurality of transmitting end CPEs 100, 101, . . . , 105 at its receiving side (i.e. input side) and is further optically interconnected to the plurality of first fibre optic links 801 and the plurality of second fibre optic links 802 and hence is optically interconnected to the plurality of transmitting end non-tuneable transponders 300, 301, . . . , 305 and the plurality of wavelength tuneable transponders 400, 401, . . . , 405;
2. The plurality of transmitting end wavelength tuneable transponders 400, 401, . . . , 405, that are optically interconnected to the plurality of second fibre optic links 802 at a receiving side (i.e. input side);
3. The 1×N optical coupler 600 that is optically interconnected to a transmitting side (i.e output side) of the plurality of transmitting end wavelength tuneable transponders 400, 401, . . . , 405;
4. The 1×2 optical coupler 601 that is optically interconnected to the output of the transmitting end CWDM/DWDM optical multiplexer 500 and the transmitting side (i.e. output side) of the 1×N optical coupler 600;
5. The first receiving end network switch 201 that is optically interconnected at its receiving side to the plurality of output lines of the receiving end CWDM/DWDM optical de-multiplexer 501 and is further optically interconnected at its transmitting side to the plurality of receiving end non-tuneable transponders 300', 301', . . . , 305' and the plurality of receiving end wavelength tuneable transponders 400', 401' . . . , 405';
6. The plurality of receiving end wavelength tuneable transponders 400', 401', . . . , 405' that are optically interconnected to the receiving side of the second receiving end network switch 202;
7. The second receiving end network switch 202 that is optically interconnected at its receiving side to the transmitting sides (i.e. output sides) of the plurality of receiving end non-tuneable transponders 300', 301', . . . , 305' and the plurality of receiving end wavelength tuneable transponders 400', 401', . . . , 405';
8. The transmitting end controller 10a that serves to control the optical switching and routing of the transmitting end network switch; and
9. The receiving end controller 10b that serves to control the optical switching and routing of the first 201 and second 202 receiving end network switches; and
10. The network monitoring and control system 100a that serves to coordinate and arbitrate the operations of both the transmitting end controller 10a and the receiving end controller 10b.

It should be noted that the plurality of transmitting end non-tuneable transponders 300, 301, . . . , 305 and the plurality of transmitting end wavelength tuneable transponders 400, 401, . . . , 405 serve to convert transmission data optical signals transmitted by the plurality of transmitting end CPEs 100, 101, . . . , 105 from 1310 nm or 1500 nm optical signals into the ITU-T DWDM (Dense Wavelength Division Multiplexing) or ITU-T CWDM (Coarse Wavelength Division Multiplexing) transmission format, before relaying aforementioned transmission data optical signals to the subsequent stage of the transmitting end 200a of the broadband optical communication network 350 of the present invention and hence the receiving end 200b via the main fiber link 700 of the broadband optical communication network 350 of the present invention. Conversely, at the receiving end 200b, the plurality of receiving end non-tuneable transponders 300', 301', . . . , 305' and the plurality of receiving end wavelength tuneable transponders 400', 401', . . . , 405' serve to the de-multiplexed transmission data optical signals, received via the output lines of the receiving end CWDM/DWDM optical de-multiplexer 501 from 1310 nm or 1500 nm optical signals into optical signals with the ITU-T DWDM/CWDM transmission format.

The operation of the broadband optical communication network 300 of the present invention will now be described with reference to FIGS. 2 to 5.

Figure 2:
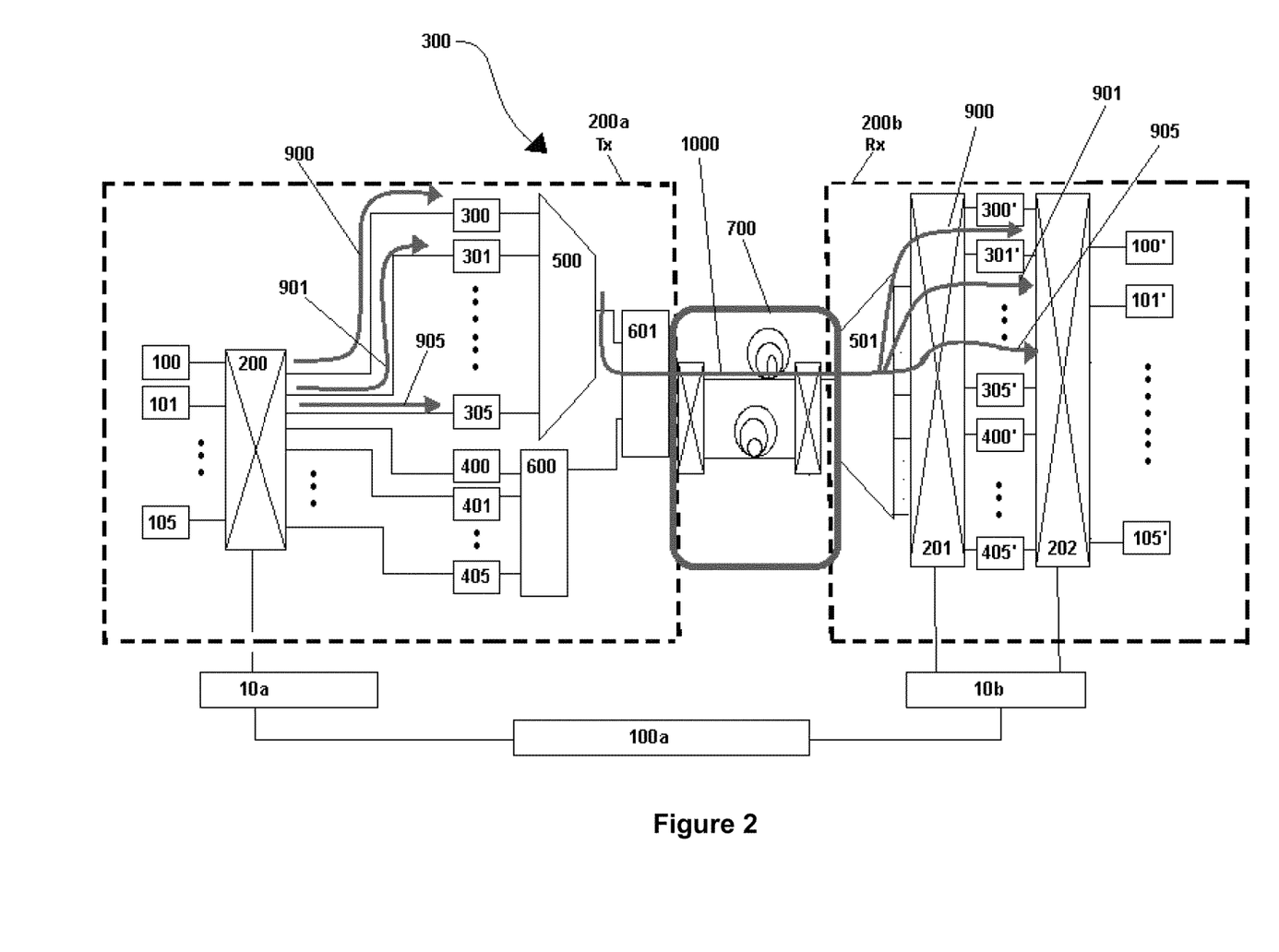
FIG. 2 is a diagram attempting to illustrate the operation of the exemplary embodiment of the broadband optical communication network of the present invention as illustrated in FIG. 1 during normal operation.

With reference to FIG. 2, during normal operation, when none of the plurality of transmitting end non-tuneable transponders 300, 301, . . . , 305 and the plurality of receiving end non-tuneable transponders 300', 301', . . . , 305' experience a fault will now be described.

Under normal operation, at the transmitting end 200a, a plurality transmission data optical signals 900, 901, . . . , 905 originating from the plurality of transmitting end CPEs 100, 101, . . . , 105 respectively are received by the transmitting end network switch 200. Said transmitting end network switch 200, subsequently transmits said plurality of transmission data optical signals 900, 901, . . . , 905 originating from the plurality of transmitting end CPEs 100, 101, . . . , 105 to the corresponding plurality of transmitting end non-tuneable transponders 300, 301, . . . , 305 upon receipt of a control signal from the transmitting end controller 10a. The plurality of transmitting end transponders 300, 301, . . . , 305 respectively receiving aforementioned respective transmission data optical signals 900, 901, . . . , 905 via the first plurality transmitting end of fibre links 801, converting the aforementioned transmission data optical signals 900, 901, . . . , 905 from 1310 nm or 1500 nm optical signals to ITU-T CWDM or DWDM transmission format transmission data optical signals 900, 901, . . . , 905 and transmitting these signals 900, 901, . . . , 905 to the transmitting end CWDM/DWDM optical multiplexer 500. Said transmitting end CWDM/DWDM optical multiplexer 500, upon receipt of the plurality of transmission data optical signals 900, 901, . . . , 905 originating from the plurality of transmitting end CPEs 100, 101, . . . , 105, subsequently wavelength multiplexes said transmission data optical signals 900, 901, . . . , 905 to consequently produce and transmit a wavelength division multiplexed transmission data optical signal 1000 to the 1×2 optical coupler 601. The 1×2 optical coupler 601 serving to optically couple the wavelength division multiplexed transmission data optical signal 1000 with a transmission data optical signal 900, 901, . . . , 905 originating from the output of the 1×N optical coupler 600. Since, under normal operation, with no faults occurring in the plurality of first fibre links 201 and plurality of transmitting end non-tuneable transponders 300, 301, . . . , 305, there will not be any transmission data optical signal 900, 901, . . . , 905 originating from any one of the plurality of transmitting end CPEs 100, 101, . . . , 105 that will routed and transmitted by the transmitting end network switch 200 to any one of the plurality of transmitting end wavelength tuneable transponders 400, 401, . . . 405 and hence no transmission data optical signal 900, 901, . . . , 905 will be fed to the 1×N optical coupler 600, resulting in the 1×N optical coupler 600 output being without an optical signal output. Consequently, the result of the optical coupling, by the 1×2 optical coupler 601 of the wavelength multiplexed transmission data optical signal 1000 with the output of the 1×N optical coupler 600 yields nothing but the wavelength multiplexed transmission data optical signal 1000. Said 1×2 optical coupler 601, subsequently transmits said wavelength multiplexed transmission data optical signal 1000 to the receiving end 200b of the broad-band optical communication network 350 of the present invention via the main fibre link 700.

Upon receipt of the wavelength multiplexed transmission data optical signal 1000 by the receiving end 200b of the broad-band optical communication network 350 of the present invention, the receiving end CWDM/DWDM optical de-multiplexer 501, de-multiplexes the received wavelength division multiplexed transmission data optical signal 1000 into its individual wavelength constituents, namely the transmission data optical signals 900, 901, . . . , 905 that respectively correspond to transmission data optical signals originating from the first transmitting end CPE 100, the second transmitting end CPE 101, . . . , and the final transmitting end CPE 105. Consequently aforementioned transmission data optical signals 900, 901, . . . , 905 become available at the transmitting side (output side) output lines of the receiving end CWDM/DWDM de-multiplexer 501 and subsequently propagate to the first receiving end network switch 201. Since, under the condition of the normal operation, where none of the none of the fibre links interconnecting the plurality of transmitting end non-tuneable transponders 300, 301, . . . , 305 at the transmitting end 200a and none of the fibre links interconnecting the plurality of receiving end non-tuneable transponders 300', 301', . . . , 305' at the receiving end 200b experience a fault, the resulting wavelength de-multiplexed transmission data optical signals 900, 901, . . . , 905, being routed by the first receiving end network switch 201 due to execution of control instructions received by the receiving end controller 10b, to the plurality of receiving end non-tuneable transponders 300', 301', . . . , 305'. The plurality of receiving end non-tuneable transponders 300', 301', . . . , 305' serving convert aforementioned de-multiplexed transmission data optical signals 900, 901, . . . , 905 from ITU-T CWDM or DWDM transmission format to 1310 nm or 1500 nm optical signals and to relay said plurality of wavelength de-multiplexed transmission data optical signal 900, 901, . . . , 905 to a second receiving end network switch 202. The second receiving end network switch 202, under the control of the receiving end controller 10b, route aforementioned wavelength de-multiplexed transmission data optical signals 900, 901, . . . , 905 to the respective receiving end CPE 100', 101', . . . , 105' of the plurality of receiving end CPEs 100', 101', . . . , 105'. More particularly, transmission data optical signal 900, having a first wavelength is routed to CPE 100', transmission data optical signal 901, having a second wavelength is routed to CPE 101' and transmission data optical signal 905, having a third wavelength is routed to CPE 105'.

Figure 3:
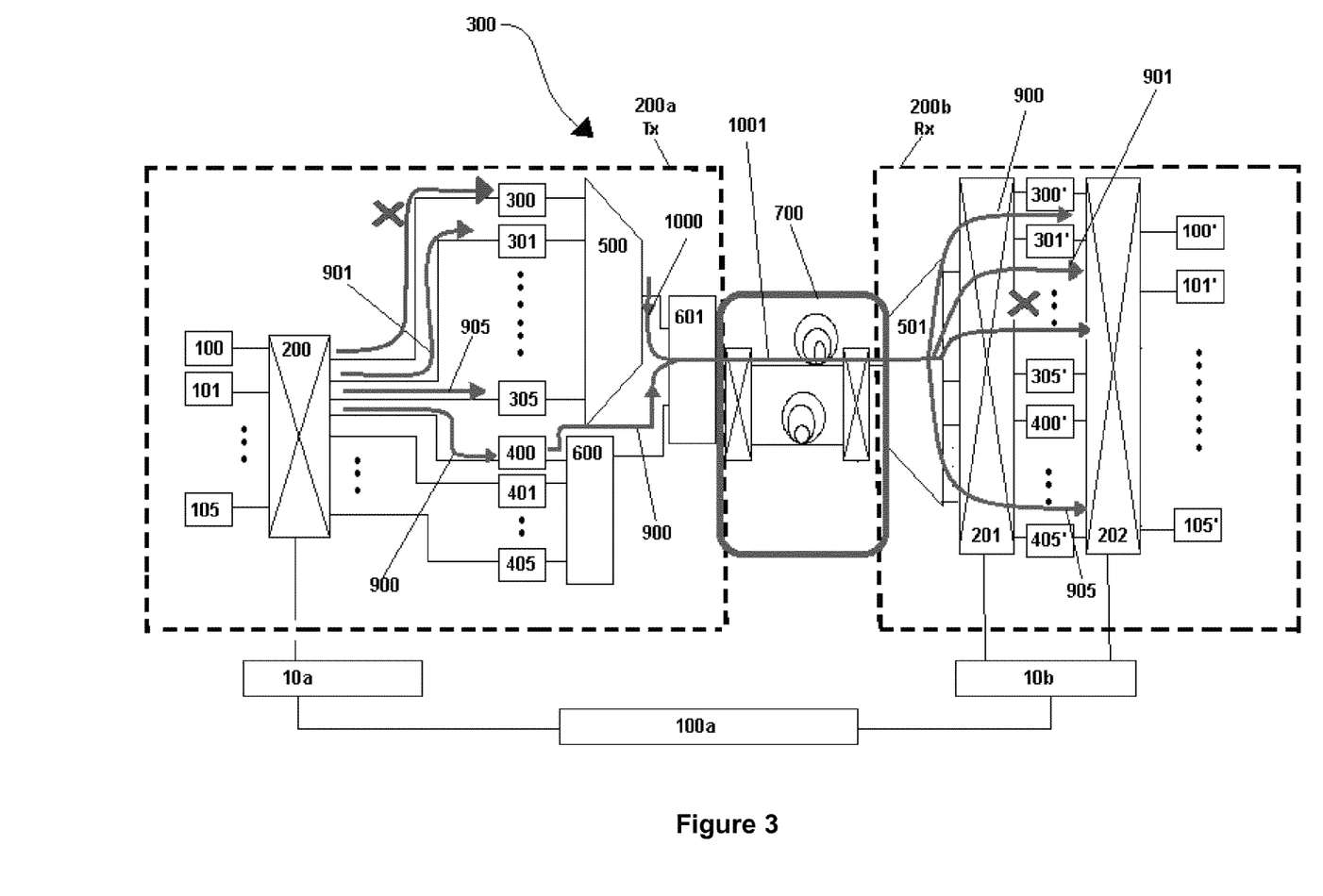
FIG. 3 is a diagram attempting to illustrate the operation of the exemplary embodiment of the broadband optical communication network of the present invention as illustrated in FIG. 1 during the case when a fault is detected both at the transmitting and receiving ends.

With reference to FIG. 3, the operation of the broadband optical communication network 350 of the present invention when there is a fault in any one of the fiber links interconnecting the plurality of transmitting end non-tuneable transponders 300, 301, . . . , 305, any one of the transmitting end non-tuneable transponders 300, 301, . . . , 305, any one of the fiber links interconnecting the plurality of receiving end non-tuneable transponders 300', 301', . . . , 305' and any one of the receiving end non-tuneable transponders 300', 301', . . . , 305'.

More particularly, with reference to FIG. 3, the operation of the broadband optical communication network 350 of the present invention when one transmission path at the transmitting end 200a, i.e. the transmission path that includes the transmitting end non-tuneable transponder 300 and the fibre links that interconnect to said transmitting end non-tuneable transponder 300 and one transmission path at the receiving end 200b, i.e. the transmission path that includes the receiving end non-tuneable transponder 305' and the fibre links that interconnect to said receiving end non-tuneable transponder 305' both experience a fault, will now be described.

At, the transmitting end 200a, since the transmission data optical signal transmission path which includes the transmitting end non-tuneable transponder 300 and the fibre link interconnecting said transmitting end non-tuneable transponder 300 which includes one of the fibre links of the first plurality of transmitting end fibre links 801 experiences a fault, the transmission data optical signal 900 having a first wavelength emitted by the first transmitting end CPE 100 and that is destined for the first non-tuneable transmitting end transponder 300, is instead instructed by the transmitting end controller 10a, to route aforementioned transmission data optical signal 900, to the corresponding transmitting end wavelength tuneable transponder 400, i.e. the wavelength tuneable transponder 400 that is symmetrically opposite in location to the faulty first non-tuneable transmitting end transponder 300. The above sequence of events effected upon detection of a fault and after tuning of the transmitting end wavelength tuneable transponder 400 by said transmitting end controller 10a. The transmitting end controller 10a, tunes aforementioned wavelength tuneable transponder 400 to be responsive to the wavelength of the first transmission data optical signal 900 emitted by the transmitting end CPE 100, by way of control signals transmitted to the transmitting end network switch 200 and executed by the transmitting end network switch 200.

Subsequent to the tuning of aforementioned transmitting end wavelength tuneable transponder 400 to be responsive to a transmission data optical signal having a first wavelength emitted by the first CPE 100 of the plurality of transmitting end CPEs 100, 101, . . . , 105, aforementioned first transmission data optical signal 900 is routed by the transmitting end network switch 200 to aforementioned transmitting end wavelength tuneable transponder 400. Said transmitting end wavelength tuneable transponder 400, converting the received transmission data optical signal 900 from a 1310 nm or 1500 nm optical signal into an optical signal with the ITU-T CWDM or DWDM transmission format transmission data optical signal. The transmission data optical signal 900 is then fed to one of the input lines of the 1×N optical coupler 600. Since the remaining normal transmission paths that include the remaining transmitting end non-tuneable transponders 301, . . . , 305 and the fibre links that interconnect to them do not experience a fault, the remaining transmission data optical signals 901, . . . , 905 originating from transmitting end CPEs 101, . . . , 105 are not transmitted to the other transmitting end wavelength tuneable transponders 401, . . . , 405 via the second plurality of transmitting end fibre links 802, consequently resulting in the output of the 1×N coupler being the transmission data optical signal 900. The output of the 1×N coupler 600, which in this case is the transmission data optical signal 900 subsequently, propagates to one of the input lines of the 1×2 coupler 601.

Since the remaining normal transmission paths that include the remaining transmitting end non-tuneable transponders 301, . . . , 305 and the fibre links that interconnect to them do not experience a fault, the remaining transmission data optical signals 901, . . . , 905 originating from transmitting end CPEs 101, . . . , 105 are transmitted with the respective fibre links of the plurality of first transmitting end fibre links 801 to aforementioned remaining transmitting end non-tuneable transponders 301, . . . , 305. Aforementioned remaining transmitting end non-tuneable transponders 301, . . . , 305 converting the received transmission data optical signals 901, . . . , 905 from the 1310 or 1500 nm optical signals to ITU-T CWDM or DWDM transmission format transmission data optical signals 901, . . . , 905. Aforementioned transmission data optical signals 901, . . . , 905 subsequently being relayed by the aforementioned remaining transmitting end non-tuneable transponders 301, . . . , 305 to the transmitting end CWDM/DWDM multiplexer 500 which wavelength multiplexes aforementioned remaining transmission data optical signal 901, ..., 905 resulting in a wavelength division multiplexed transmission data optical signal 1000 at the output of the transmitting end CWDM/DWDM optical multiplexer 500 that subsequently propagates to another one of the two input lines of the 1×2 optical coupler 601 (the other input line receiving the transmission data optical signal 900 via the 1×N optical coupler 600).

The resulting output of the 1×2 optical coupler 601 due to the coupling of the wavelength multiplexed transmission data optical signal 1000 from the output of the transmitting end CWDM/DWDM multiplexer 500 and the coupling of the transmission data optical signal 900 from the output of the transmitting end 1×N optical coupler 600 is a composite optical signal 1001, subsequently launches into the main fibre link 700.

Upon receipt of the composite optical signal 1001 at the receiving end 200b of the broadband optical communication network 350 of the present invention, aforementioned composite optical signal 1001 is wavelength de-multiplexed by the receiving end CWDM/DWDM wavelength de-multiplexer 501 into is constituent transmission data optical signals 900, 901, ..., 905. Since, as has been mentioned in passages preceding this passage, that in the description of the operation of the broadband optical communication network 350 of the present invention, the receiving end non-tuneable transponder 305' and the fibre links interconnecting to it experiences a fault, the plurality of transmission data optical signal 900, 901, ..., 905 that result from the optical de-multiplexing of the composite optical signal 1001, are respectively received and routed by the first receiving end network switch 201 to the receiving end non-tuneable transponder 300', the receiving end non-tuneable transponder 301' and the receiving wavelength tuneable transponder 405'. More particularly transmission data optical signal 900 is routed to the receiving end non-tuneable transponder 300', transmission data optical signal 901 is routed to the receiving end non-tuneable transponder 301' and the transmission data optical signal 905 is routed to the receiving end wavelength tuneable transponder 405'. The receiving end first network switch 201 transmitting and receiving control instructions from the receiving end controller 10b with relation to the detection of a fault in the receiving end non-tuneable transponder 305' and the fibre links interconnecting to it and subsequently tuning the receiving end wavelength tuneable transponder 405' to be responsive to the same wavelength transmission data optical signal (i.e. transmission data optical signal 905) as the receiving end non-tuneable transponder 305'.

Upon reception of the plurality of transmission data optical signals 900, 901, ..., 905 by the receiving end non-tuneable transponder 300', the receiving end non-tuneable transponder 301' and the receiving end wavelength tuneable transponder 305' respectively. Aforementioned transmission data optical signals 900, 901, ..., 905 are converted from the ITU-T CWDM/DWDM frame format to 1310 nm or 1500 nm transmission data optical signals 900, 901, ..., 905 and transmitted to the respective input lines at the receiving side (i.e. input side) of the second receiving end network switch 202. Aforementioned second receiving network switch 202 under the control of the receiving end controller 10b, subsequently routes aforementioned converted transmission data optical signal 900, 901, ..., 905 originating respectively from said receiving end non-tuneable transponder 300', receiving non-tuneable transponder 301' and receiving end wavelength tuneable transponder 400' to the corresponding receiving end CPE 100', 101', ..., 105' of the plurality of receiving end CPEs 100', 101', ..., 105'.

The invention claimed is:

1. An apparatus including an improved broadband optical communication network, said improved broadband optical communication network including an optical channel protection apparatus, said improved broadband optical communication network comprising:
  a transmitting end that incorporates a transmitting-end portion of said improved optical channel protection apparatus,
  a receiving end that incorporates a receiving-end portion of said optical channel protection apparatus, and
  a main fiber link that optically interconnects said transmitting end and said receiving end,
    wherein said transmitting-end portion of said optical channel protection apparatus comprises a plurality of wavelength tunable transmitting-end transponders, a transmitting-end network switch that is optically interconnected to a plurality of transmitting customer premise equipment units at an input side thereof and that is optically interconnected to a plurality of non-tunable transmitting-end transponders and to said plurality of wavelength tunable transmitting-end transponders at an output side thereof, a 1×N optical coupler that is optically interconnected to a plurality of output lines of said plurality of wavelength-tunable transmitting-end transponders at an input side thereof, a 1×2 optical coupler having input lines, one of which is optically interconnected to an output side of said 1×N optical coupler and another one of which is optically interconnected to an output of a transmitting-end wavelength division multiplexer, and a transmitting-end controller that is electrically interconnected to said transmitting-end network switch and that serves to control routing of optical signals by said transmitting-end network switch, and
  wherein said receiving-end portion of said optical channel protection apparatus comprises a plurality of receiving-end wavelength tunable transponders, a first receiving-end network switch that is optically interconnected to a plurality of output lines of a receiving-end optical wavelength de-multiplexer at an input side and that is optically interconnected to a plurality of receiving-end non-tunable transponders and to said plurality of receiving-end wavelength tunable transponders, a second receiving-end network switch that is optically interconnected to said plurality of receiving-end non-tunable transponders and to said plurality of receiving-end wavelength tunable transponders at an input side and that is optically interconnected to a plurality of receiving-end customer premise equipment units at an output side, and a receiving-end controller that is electrically interconnected to said first receiving-end network switch and to said second receiving-end network switch that serve to control routing of optical signals by said first network switch and said second network switches.

2. The apparatus of claim 1, wherein said transmitting-end wavelength division multiplexer comprises a coarse wavelength division multiplexer.

3. The apparatus of claim 1, wherein said transmitting-end wavelength division multiplexer comprises a dense wavelength division multiplexer.

4. The apparatus of claim 1, wherein said receiving-end optical wavelength de-multiplexer comprises a coarse wavelength division de-multiplexer.

5. The apparatus of claim 1, wherein said receiving-end optical wavelength de-multiplexer comprises a dense wavelength division de-multiplexer.

6. The apparatus of claim 1, wherein said transmitting-end wavelength division multiplexer is optically interconnected to the outputs of the plurality of non-tunable transmitting-end transponders at an input side thereof.

7. The apparatus of claim 1, wherein operation of said transmitting-end controller and operation of said receiving-end controller are coordinated and arbitrated by a network monitoring and control system.

\* \* \* \* \*